(12) United States Patent
Chen (10) Patent No.: US 11,473,609 B2
(45) Date of Patent: Oct. 18, 2022

(54) THERMAL INSULATING SCREW ASSEMBLY

(71) Applicant: Wei-Chih Chen, Taichung (TW)

(72) Inventor: Wei-Chih Chen, Taichung (TW)

( * ) Notice: Subject to any disclaimer, the term of this patent is extended or adjusted under 35 U.S.C. 154(b) by 274 days.

(21) Appl. No.: 16/891,255

(22) Filed: Jun. 3, 2020

(65) Prior Publication Data

US 2021/0215188 A1 Jul. 15, 2021

(30) Foreign Application Priority Data

Jan. 10, 2020 (TW) ................. 109200411

(51) Int. Cl.
*F16B 37/04* (2006.01)
*F16B 33/00* (2006.01)
*F16B 43/00* (2006.01)

(52) U.S. Cl.
CPC .......... *F16B 33/004* (2013.01); *F16B 43/001* (2013.01)

(58) Field of Classification Search
CPC ............................ F16B 43/001; F16B 33/004
USPC ....................................... 411/368, 372, 371.1
See application file for complete search history.

(56) References Cited

U.S. PATENT DOCUMENTS

| | | | | |
|---|---|---|---|---|
| 4,726,164 A | * | 2/1988 | Reinwall | E04D 3/3603 411/533 |
| 4,781,503 A | * | 11/1988 | Bogel | F16B 25/0063 411/533 |
| 4,881,861 A | * | 11/1989 | Hewison | E04D 3/3603 411/383 |
| 5,378,102 A | * | 1/1995 | Mossman | E04D 3/3603 411/533 |
| 9,080,327 B2 | * | 7/2015 | Hohmann, Jr. | E04B 1/7616 |
| 9,140,001 B1 | * | 9/2015 | Hohmann, Jr. | F16B 25/103 |
| 9,334,646 B2 | * | 5/2016 | Hohmann, Jr. | E04B 1/4185 |
| 10,968,638 B1 | * | 4/2021 | Hohmann, Jr. | E04B 1/4178 |
| 11,078,663 B1 | * | 8/2021 | Wigboldy | E04B 1/7637 |
| 11,130,168 B2 | * | 9/2021 | Hohmann, Jr. | B21K 23/04 |
| 2010/0051490 A1 | * | 3/2010 | Shinjo | F16B 25/103 206/347 |
| 2012/0304576 A1 | * | 12/2012 | Hohmann, Jr. | E04B 1/4178 52/699 |
| 2013/0280013 A1 | * | 10/2013 | Gong | F16B 25/0084 411/387.1 |
| 2018/0142723 A1 | * | 5/2018 | Craven, Jr. | F16B 35/06 |
| 2020/0116187 A1 | * | 4/2020 | Chen | F16B 25/0078 |

* cited by examiner

*Primary Examiner* — Gary W Estremsky
(74) *Attorney, Agent, or Firm* — Alan D. Kamrath; Karin L. Williams; Mayer & Williams PC (57) ABSTRACT

A thermal insulating screw assembly includes a thermal insulating screw and a thermal insulating washer. The thermal insulating screw has a rotation head, a shank, and an external thread. A thermal insulating portion coats the rotation head and has a plurality of projections each of which is provided with a horizontal face, a vertical face, and an inclined face. The horizontal face is located at a top of each of the projections. The vertical face extends downward from the horizontal face. The inclined face extends inward and downward from the vertical face. The thermal insulating washer is positioned by the projections and has an axial hole which passes through the inclined face and the vertical face to the horizontal face, and is positioned on the horizontal face of each of the projections.

14 Claims, 9 Drawing Sheets

THERMAL INSULATING SCREW ASSEMBLY

BACKGROUND OF THE INVENTION

1. Field of the Invention

The present invention relates to a hand tool and, more particularly, to a thermal (or heat) insulating screw assembly.

2. Description of the Related Art

A self drilling tapping (or self-tapping) screw is available for assembly of a drywall of a construction or an architecture work. A conventional self drilling tapping screw assembly comprises a screw and an annular washer mounted on the screw. The screw has a first end provided with an enlarged head, a middle provided with a shank, and a second end provided with a drilling portion. The shank is provided with an external thread. The annular washer is mounted on the shank and rests on the enlarged head of the screw. In operation, the enlarged head is driven and rotated by a driving tool to rotate the screw, such that the drilling portion is drilled through a workpiece. When the annular washer touches the workpiece, the screw stops rotating. However, the user has to mount the annular washer on the shank of the screw, there causing inconvenience to the user when operating the screw. In addition, the annular washer is not secured to the enlarged head of the screw, such that the annular washer is easily detached from the shank of the screw. Further, the enlarged head of the screw does not have a heat insulating effect, and cannot stop entrance of the hot or cold air, such that the hot or cold air easily enters the house.

A conventional was disclosed in the U.S. Patent Publication No. 2013/0280013, and comprises a thermal break fastener 10. The fastener 10 includes generally, a drive head 11, a seal 30, a shank 24, and a driving/boring element 36. A plurality of outwardly extending flexible fingers 134 extend from the wall 128 toward the head 111. The fingers 134 extend to a location 160 below the head 111, thus defining a space 160 between the ends 135 of the fingers 134 and the head 111. The seal 130 is fitted into the space 160 and is secured in place by the fingers 134 which, once the seal 130 is passed over the fingers 134, flex back outwardly to hold the seal 130 in place between the ends 135 of the fingers 134 and the head recess 122. However, the fastener 10 is a common screw and cannot function as a thermal insulating screw. The rotation portion of the fastener 10 is not coated with a thermal insulating material, such that the fastener 10 cannot isolate the thermal conducting action, thereby decreasing the thermal insulating effect.

BRIEF SUMMARY OF THE INVENTION

The primary objective of the present invention is to provide a thermal insulating screw assembly that has a positioning function and provides a thermal insulating effect.

In accordance with the present invention, there is provided a thermal insulating screw assembly comprising a thermal insulating screw and a thermal insulating washer mounted on the thermal insulating screw. The thermal insulating screw has a first end provided with a rotation head and a second end provided with a shank and an external thread. The external thread has a first end connected with the shank and a second end provided with a drilling portion. The rotation head of the thermal insulating screw is provided with a thermal insulating portion which coats and covers the rotation head. The thermal insulating portion has a lower end extending to the shank and provided with a plurality of projections. Each of the projections is provided with a horizontal face, a vertical face, and an inclined face. The horizontal face is located at a top of each of the projections. The vertical face extends downward from the horizontal face. The inclined face extends inward and downward from the vertical face. The thermal insulating washer is positioned by the projections of the thermal insulating portion. The thermal insulating washer has a central portion provided with an axial hole mounted on the thermal insulating portion. The axial hole of the thermal insulating washer has an inner diameter flush with an outer diameter of the vertical face of each of the projections. The axial hole of the thermal insulating washer pass through the inclined face and the vertical face to the horizontal face, and is positioned on the horizontal face of each of the projections.

According to the primary advantage of the present invention, the thermal insulating washer is positioned by the projections of the thermal insulating portion, and located between the rotation head of the thermal insulating screw and the projections of the thermal insulating portion, thereby preventing the thermal insulating washer from being detached from the thermal insulating screw.

According to another advantage of the present invention, the thermal insulating portion and the thermal insulating washer provide a thermal insulating effect to break or block the heat conduction or convection, so as to prevent entrance of the cold or hot air, thereby preventing the cold or hot air from entering the house.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a thermal insulating screw assembly in accordance with the preferred embodiment of the present invention comprises a thermal insulating screw 10 and a thermal insulating washer 30 mounted on the thermal insulating screw 10.

The thermal insulating screw 10 has a first end provided with a rotation head 11 and a second end provided with a shank 12 and an external thread 13. The external thread 13 has a first end connected with the shank 12 and a second end provided with a drilling portion 14. The rotation head 11 of the thermal insulating screw 10 is provided with a thermal insulating portion 20 which coats and covers the rotation head 11.

The thermal insulating portion 20 has a lower end extending to the shank 12 and provided with a plurality of projections 21 which are equally distant from each other. Each of the projections 21 is provided with a horizontal face 22, a vertical face 23, and an inclined face 24. The horizontal face 22 is located at a top of each of the projections 21. The vertical face 23 extends downward from the horizontal face 22. The inclined face 24 extends inward and downward from the vertical face 23.

The thermal insulating washer 30 is positioned by the projections 21 of the thermal insulating portion 20. The thermal insulating washer 30 has a central portion provided with an axial hole mounted on the thermal insulating portion 20. The axial hole of the thermal insulating washer 30 has an inner diameter flush with (or equal to) an outer diameter of the vertical face 23 of each of the projections 21, such that the axial hole of the thermal insulating washer 30 passes through the inclined face 24 and the vertical face 23 to the horizontal face 22, and is positioned on the horizontal face 22 of each of the projections 21.

In the preferred embodiment of the present invention, the external thread 13 of the thermal insulating screw 10 is detachably connected with the shank 12. Thus, the external thread 13 of the thermal insulating screw 10 can be separated from the shank 12.

In the preferred embodiment of the present invention, the thermal insulating portion 20 is provided with an angled guide face 25 that is lower than each of the projections 21.

In the preferred embodiment of the present invention, the drilling portion 14 of the thermal insulating screw 10 is a drill tip. Alternatively, the drilling portion 14 of the thermal insulating screw 10 has a conic shape.

Figure 1:
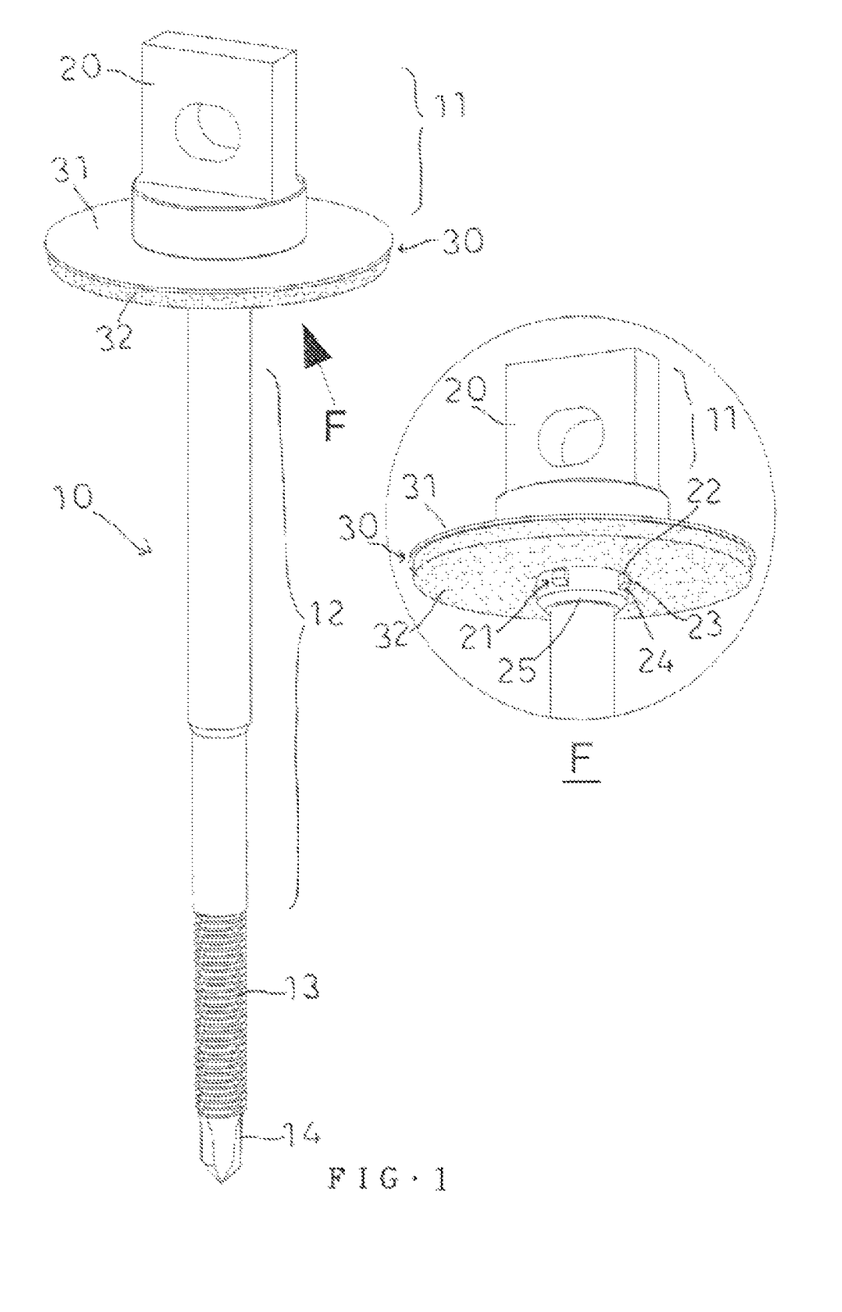
FIG. 1 includes is a perspective view of a thermal insulating screw assembly in accordance with the first preferred embodiment of the present invention, and a locally enlarged view taken along an arrow F.
Figure 2:
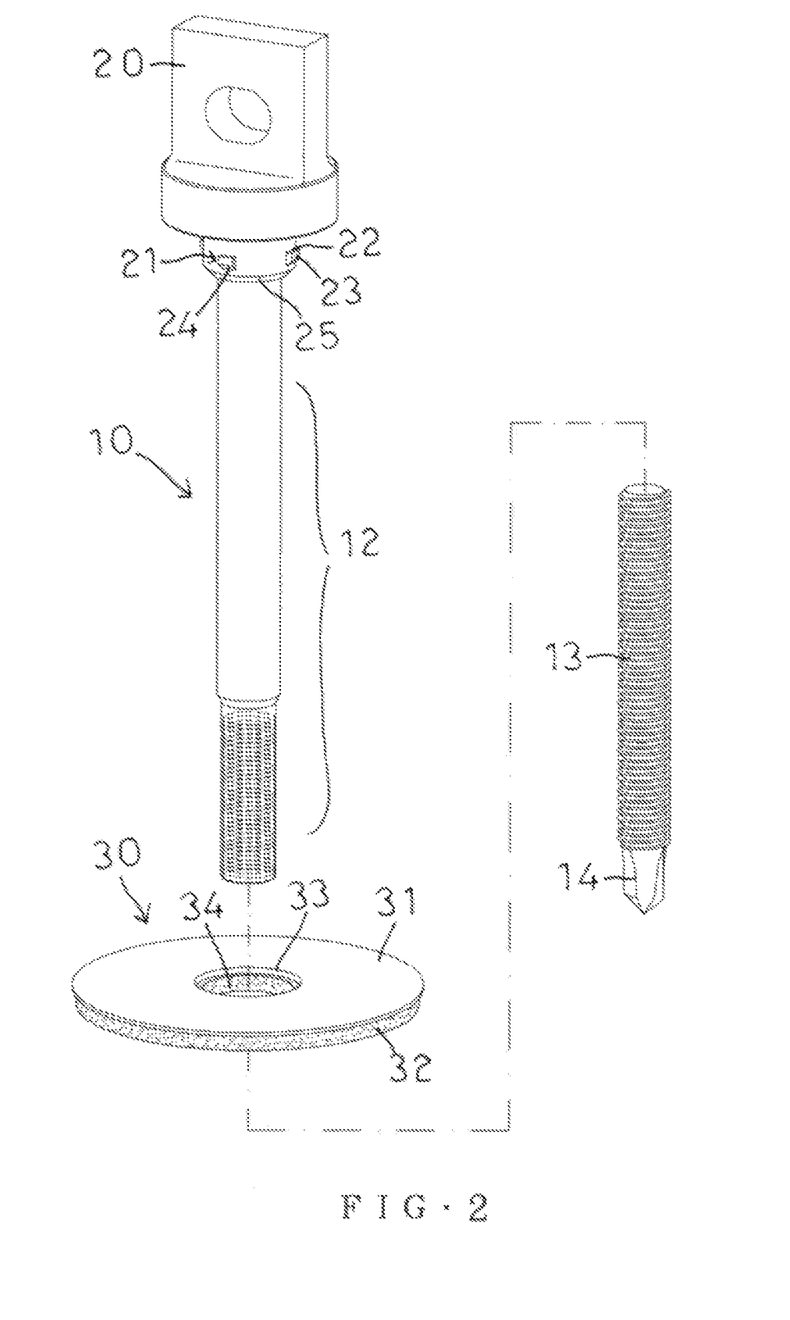
FIG. 2 is an exploded perspective view of the thermal insulating screw assembly in accordance with the first preferred embodiment of the present invention.
Figure 3:
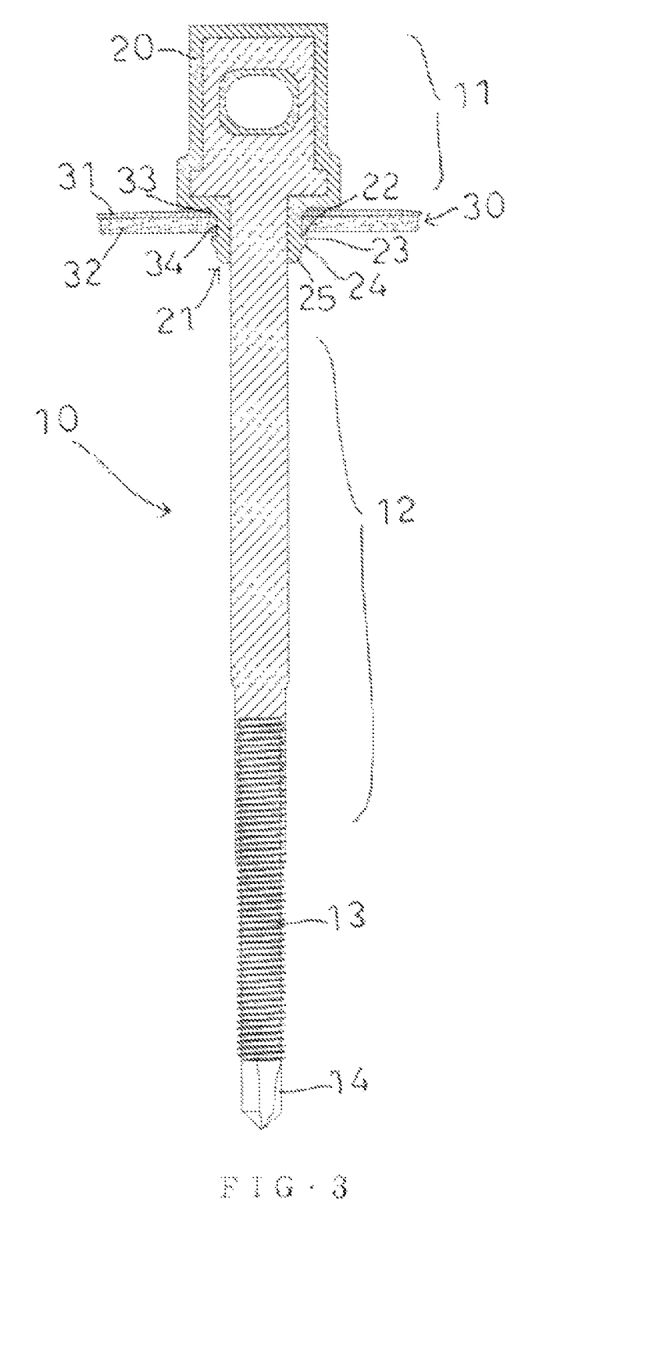
FIG. 3 is a cross-sectional view of the thermal insulating screw assembly in accordance with the first preferred embodiment of the present invention.
Figure 4:
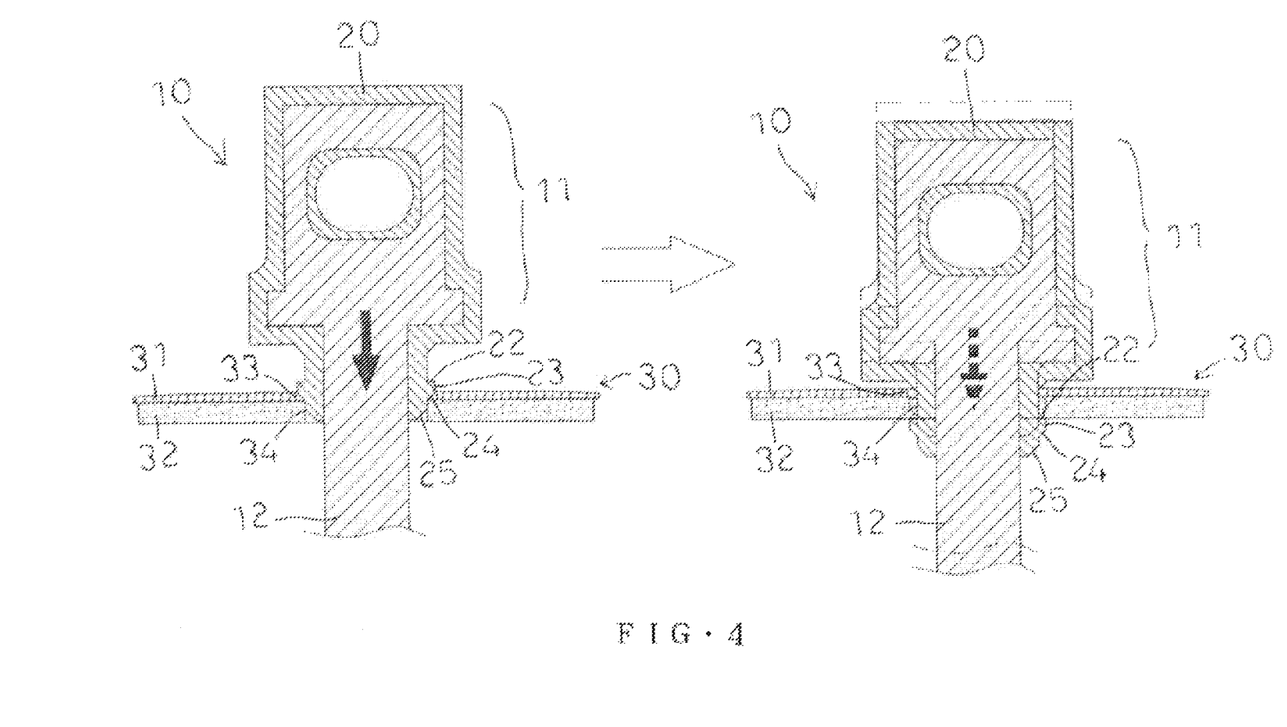
FIG. 4 is a cross-sectional operational view showing assembly and positioning of a thermal insulating washer in accordance with the first preferred embodiment of the present invention.

In the preferred embodiment of the present invention, the thermal insulating washer 30 is a two-part washer and includes a metal portion 31 and a resilient (or soft) portion 32. The axial hole of the thermal insulating washer 30 is a stepped (or two-part) hole and includes a first axial hole 33 formed in the metal portion 31 and a second axial hole 34 formed in the resilient portion 32. The first axial hole 33 has an inner diameter more (or greater) than that of the second axial hole 34. The inner diameter of the first axial hole 33 is flush with (or equal to) the outer diameter of the vertical face 23 of each of the projections 21, such that the first axial hole 33 of the metal portion 31 passes through the angled guide face 25, the inclined face 24, and the vertical face 23 to the horizontal face 22, and the second axial hole 34 of the resilient portion 32 is positioned on the horizontal face 22 of each of the projections 21 as shown in FIG. 4. At this time, the horizontal face 22 of each of the projections 21 rests on the bottom of the resilient portion 32.

In the preferred embodiment of the present invention, the rotation head 11 of the thermal insulating screw 10 is a sheet plate. Alternatively, the rotation head 11 of the thermal insulating screw 10 has a hexagonal shape. Alternatively, the rotation head 11 of the thermal insulating screw 10 has a conic shape. Thus, when the rotation head 11 is driven by a driving tool, the rotation head 11 is rotated such that the thrust screw 10 is rotated with the rotation head 11.

Figure 5:
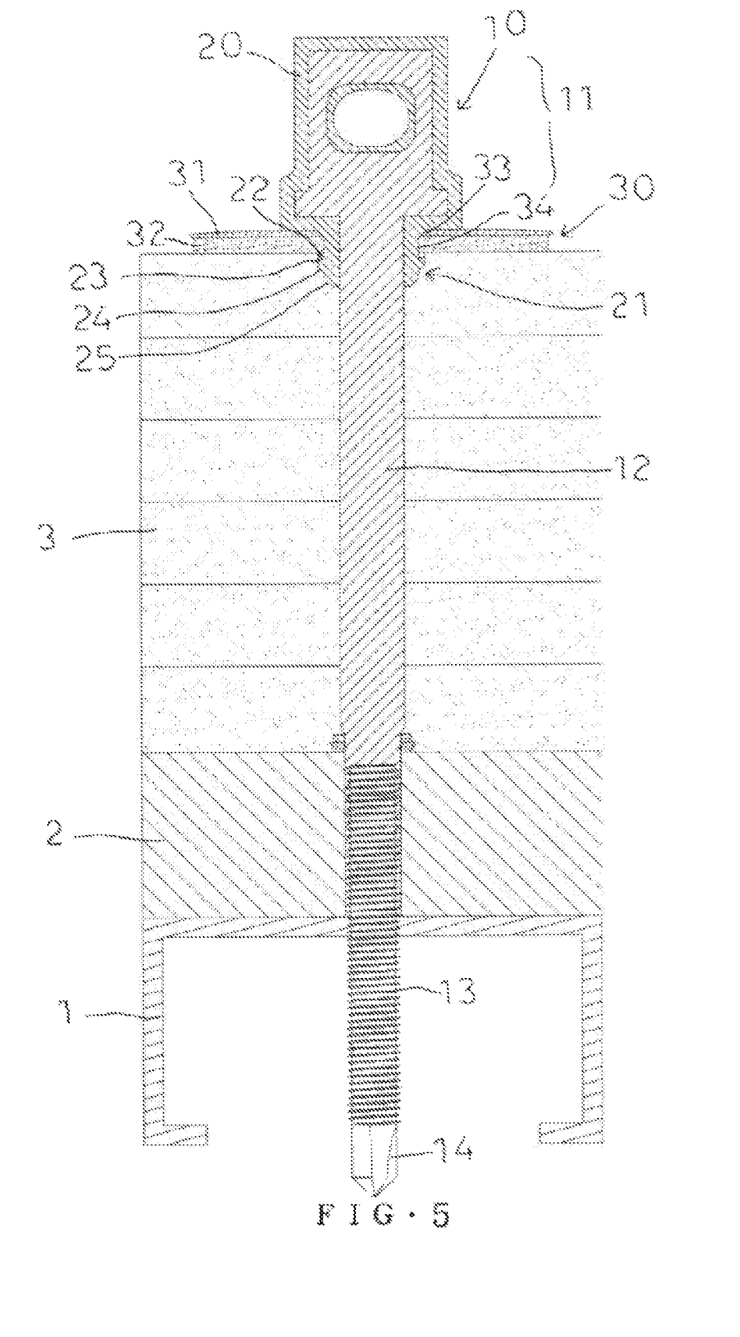
FIG. 5 is a cross-sectional operational view showing a finished condition of an assembly work of the thermal insulating screw assembly in accordance with the first preferred embodiment of the present invention.

In operation, referring to FIG. 5 with reference to FIGS. 1-4, a first article 2 is placed on a metal article 3, and a plurality of second articles 3 are placed on the first article 2. When the rotation head 11 is driven and rotated by the driving tool, the thrust screw 10 is rotated, such that the drilling portion 14 is drilled through the second articles 3, the first article 2, and the metal article 3, and the external thread 13 is screwed through the second articles 3, the first article 2, and the metal article 3. When the thermal insulating washer 30 touches the uppermost one of the second articles 3, the thrust screw 10 stops rotating. In such a manner, the thermal insulating washer 30 separates the rotation head 11 from the second articles 3 to prevent the rotation head 11 from pressing the second articles 3 directly. In addition, the resilient portion 32 of the thermal insulating washer 30 has an elastic feature to enhance the screwing and locking force of the external thread 13, such that the thermal insulating washer 30 rests on the second articles 3 smoothly and evenly. Further, the thermal insulating washer 30 presses the second articles 3 closely and tightly by the ductility of the resilient portion 32, to provide a thermal insulating effect and to break or block a heat conduction, thereby preventing the cold or hot air from entering the house.

Accordingly, the thermal insulating washer 30 is positioned by the projections 21 of the thermal insulating portion 20, and located between the rotation head 11 of the thermal insulating screw 10 and the projections 21 of the thermal insulating portion 20, thereby preventing the thermal insulating washer 30 from being detached from the thermal insulating screw 10. In addition, the thermal insulating portion 20 and the thermal insulating washer 30 provide a thermal insulating effect to break or block the heat conduction or convection, so as to prevent entrance of the cold or hot air, thereby preventing the cold or hot air from entering the house.

Referring to FIGS. 6-9, the thermal insulating screw 40 has a first end provided with a rotation head 41 and a second end provided with a shank 42 and an external thread 43. The external thread 43 has a first end connected with the shank 42 and a second end provided with a drilling portion 44. The external thread 43 and the shank 42 are formed integrally. The thermal insulating portion 20 coats and covers the rotation head 41. The lower end of the thermal insulating portion 20 extends to the shank 12. Preferably, the drilling portion 44 of the thermal insulating screw 40 is a drill tip. Alternatively, the drilling portion 44 of the thermal insulating screw 40 has a conic shape. Preferably, the rotation head 41 of the thermal insulating screw 40 is a sheet plate. Alternatively, the rotation head 41 of the thermal insulating screw 40 has a hexagonal shape. Alternatively, the rotation head 41 of the thermal insulating screw 40 has a conic shape. Thus, when the rotation head 41 is driven by a driving tool, the rotation head 41 is rotated such that the thrust screw 40 is rotated with the rotation head 11.

Figure 6:
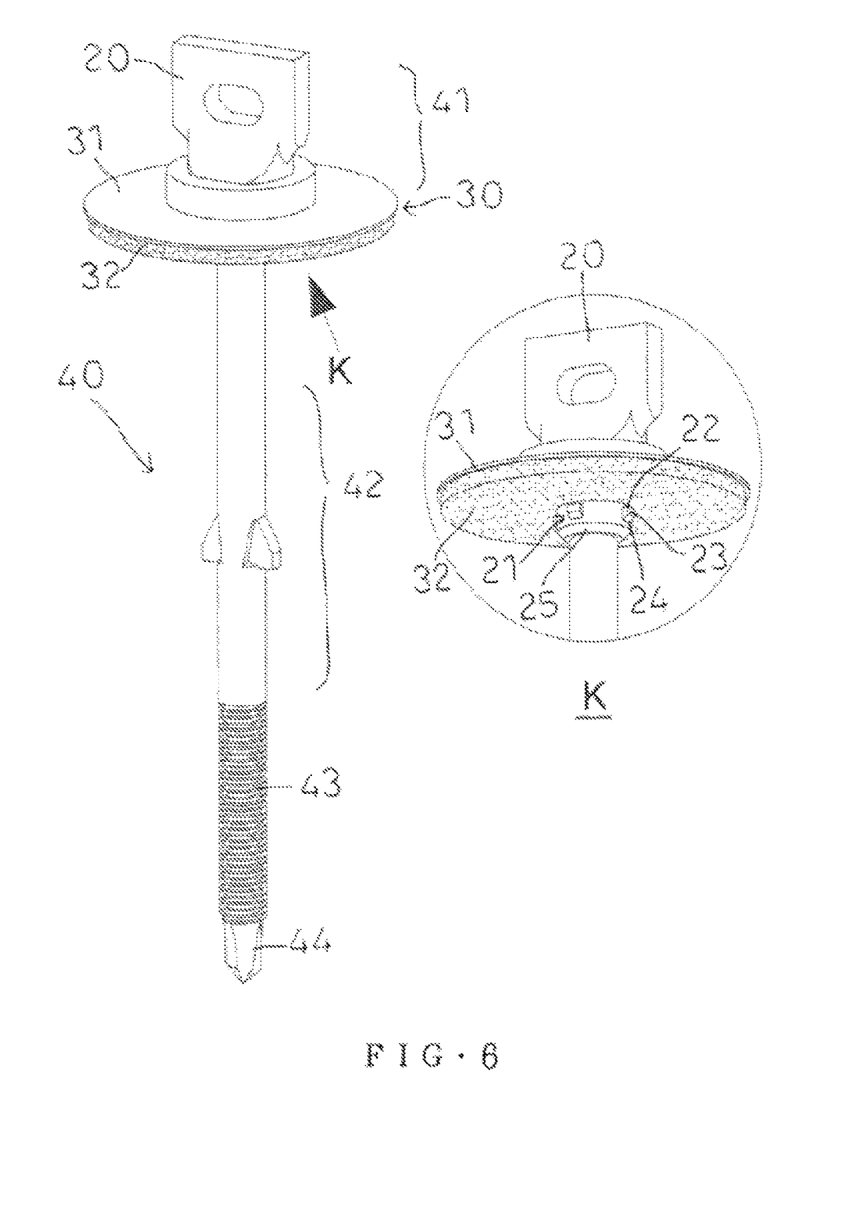
FIG. 6 includes is a perspective view of a thermal insulating screw assembly in accordance with the second preferred embodiment of the present invention, and a locally enlarged view taken along an arrow K.
Figure 7:
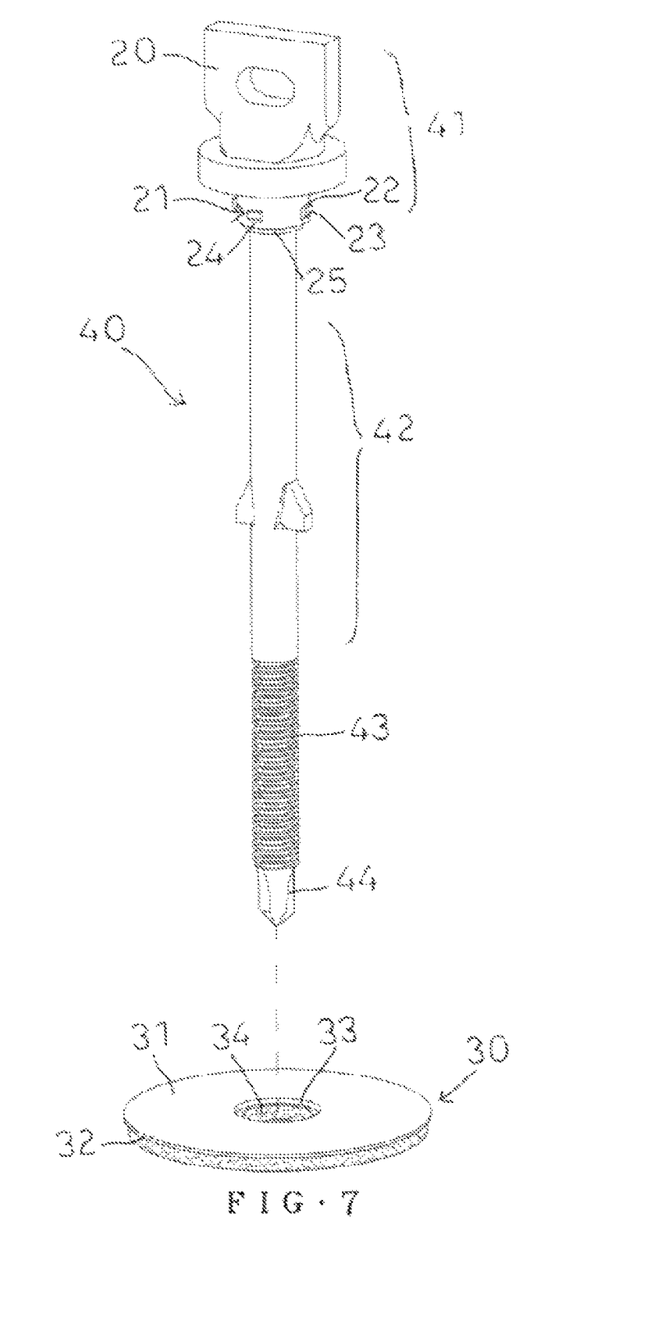
FIG. 7 is an exploded perspective view of the thermal insulating screw assembly in accordance with the second preferred embodiment of the present invention.
Figure 8:
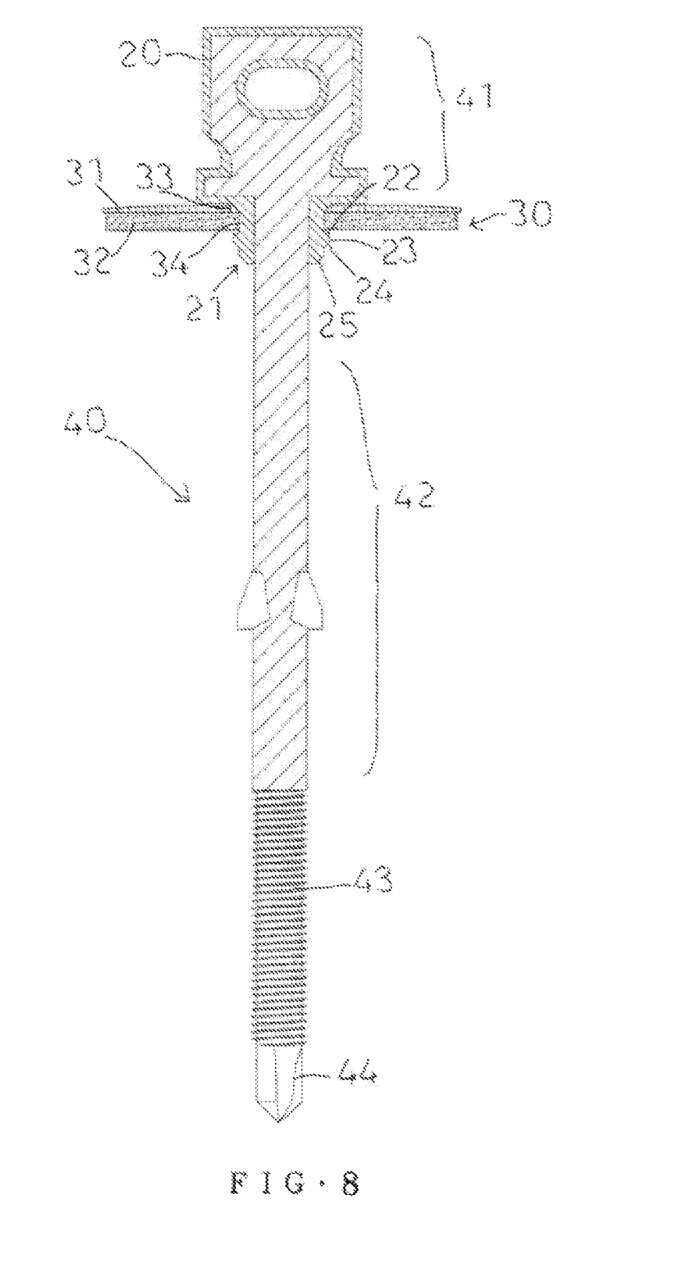
FIG. 8 is a cross-sectional view of the thermal insulating screw assembly in accordance with the second preferred embodiment of the present invention.
Figure 9:
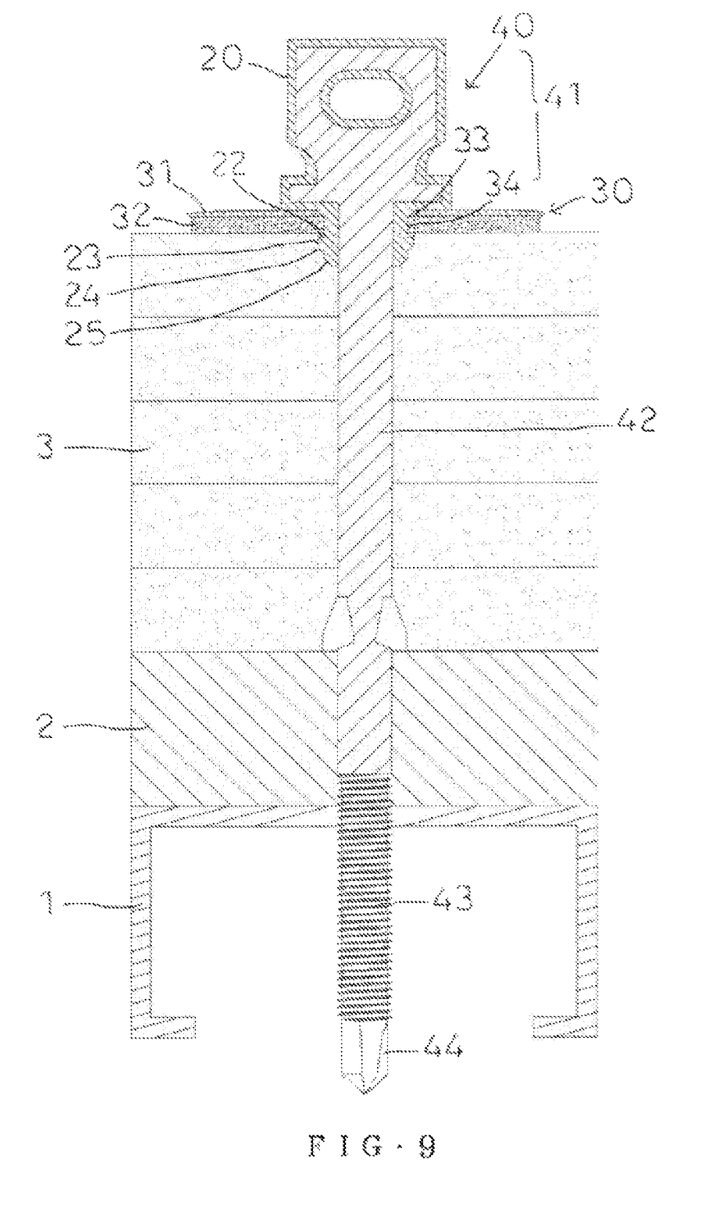
FIG. 9 is a cross-sectional operational view showing a finished condition of an assembly work of the thermal insulating screw assembly in accordance with the second preferred embodiment of the present invention.

In operation, referring to FIG. 9 with reference to FIGS. 6-8, when the rotation head 41 is driven and rotated by the driving tool, the thrust screw 40 is rotated, such that the drilling portion 44 is drilled through the second articles 3, the first article 2, and the metal article 3, and the external thread 43 is screwed through the second articles 3, the first article 2, and the metal article 3. When the thermal insulating washer 30 touches the uppermost one of the second articles 3, the thrust screw 40 stops rotating. In such a manner, the thermal insulating washer 30 separates the rotation head 41 from the second articles 3 to prevent the rotation head 41 from pressing the second articles 3 directly. In addition, the resilient portion 32 of the thermal insulating washer 30 has an elastic feature to enhance the screwing and locking force of the external thread 43, such that the thermal insulating washer 30 rests on the second articles 3 smoothly and evenly. Further, the thermal insulating washer 30 presses the second articles 3 closely and tightly by the ductility of the resilient portion 32, to provide a thermal insulating effect and to break or block a heat conduction, thereby preventing the cold or hot air from entering the house.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A thermal insulating screw assembly comprising:
   a thermal insulating screw; and
   a thermal insulating washer mounted on the thermal insulating screw;
   wherein:
   the thermal insulating screw has a first end provided with a rotation head and a second end provided with a shank and an external thread;
   the external thread and the shank are formed integrally;
   the external thread has a first end connected with the shank and a second end provided with a drilling portion;
   the rotation head of the thermal insulating screw is provided with a thermal insulating portion which coats and covers the rotation head;
   the thermal insulating portion has a lower end extending to the shank and provided with a plurality of projections;
   each of the projections is provided with a horizontal face, a vertical face, and an inclined face;
   the horizontal face is located at a top of each of the projections;
   the vertical face extends downward from the horizontal face;
   the inclined face extends inward and downward from the vertical face;
   the thermal insulating washer is positioned by the projections of the thermal insulating portion;
   the thermal insulating washer includes a metal portion and a resilient portion;
   the thermal insulating washer has a central portion provided with an axial hole mounted on the thermal insulating portion;
   the axial hole of the thermal insulating washer has an inner diameter flush with an outer diameter of the vertical face of each of the projections;
   the axial hole of the thermal insulating washer passes through the inclined face and the vertical face to the horizontal face, and is positioned on the horizontal face of each of the projections;
   the axial hole of the thermal insulating washer includes a first axial hole formed in the metal portion and a second axial hole formed in the resilient portion;
   the first axial hole has an inner diameter more than that of the second axial hole;
   the inner diameter of the first axial hole is equal to the outer diameter of the vertical face of each of the projections, such that the first axial hole of the metal portion passes through the angled guide face, the inclined face, and the vertical face to the horizontal face, and the second axial hole of the resilient portion is positioned on the horizontal face of each of the projections; and
   the horizontal face of each of the projections rests on the bottom of the resilient portion.

2. The thermal insulating screw assembly of claim 1, wherein the thermal insulating portion is provided with an angled guide face that is lower than each of the projections and higher than the shank.

3. The thermal insulating screw assembly of claim 1, wherein the thermal insulating screw has a conic shape.

4. The thermal insulating screw assembly of claim 1, wherein the drilling portion of the thermal insulating screw is a drill tip.

5. The thermal insulating screw assembly of claim 1, wherein the rotation head of the thermal insulating screw is a sheet plate, has a hexagonal shape or has a conic shape.

6. The thermal insulating screw assembly of claim 1, wherein the thermal insulating washer is removable from the thermal insulating screw.

7. The thermal insulating screw assembly of claim 1, wherein the thermal insulating washer is detachable from the projections of the thermal insulating portion.

8. The thermal insulating screw assembly of claim 1, wherein the thermal insulating washer is supported by the projections of the thermal insulating portion.

9. The thermal insulating screw assembly of claim 1, wherein the thermal insulating washer presses the projections of the thermal insulating portion.

10. The thermal insulating screw assembly of claim 1, wherein the vertical face of each of the projections is parallel with the axial hole of the thermal insulating washer.

11. The thermal insulating screw assembly of claim 1, wherein the vertical face of each of the projections is a flat plane.

12. The thermal insulating screw assembly of claim 1, wherein the inclined face of each of the projections is a flat plane.

13. The thermal insulating screw assembly of claim 1, wherein the horizontal face of each of the projections is a flat plane.

14. The thermal insulating screw assembly of claim 1, wherein the horizontal face of each of the projections is perpendicular to the axial hole of the thermal insulating washer.

* * * * *